US012580631B2

(12) United States Patent     (10) Patent No.: US 12,580,631 B2

Ye et al.     (45) Date of Patent: Mar. 17, 2026

(54) QCL RELATIONSHIP DETERMINATION METHOD AND DEVICE, NODE, AND STORAGE MEDIUM

(71) Applicant: ZTE CORPORATION, Shenzhen (CN)

(72) Inventors: Xinquan Ye, Shenzhen (CN); Shujuan Zhang, Shenzhen (CN); Yijian Chen, Shenzhen (CN); Guanghui Yu, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 356 days.

(21) Appl. No.: 18/259,872

(22) PCT Filed: Dec. 24, 2021

(86) PCT No.: PCT/CN2021/141204

§ 371 (c)(1),
(2) Date: Jun. 29, 2023

(87) PCT Pub. No.: WO2022/143459

PCT Pub. Date: Jul. 7, 2022

(65) Prior Publication Data

US 2024/0072874 A1     Feb. 29, 2024

(30) Foreign Application Priority Data

Dec. 31, 2020    (CN) ......................... 202011633396.5

(51) Int. Cl.
    *H04B 7/06*     (2006.01)
    *H04L 5/00*     (2006.01)

(52) U.S. Cl.
    CPC ....... *H04B 7/06968* (2023.05); *H04L 5/0051* (2013.01)

(58) Field of Classification Search
    CPC . H04B 7/06968; H04L 5/0023; H04L 5/0048; H04L 5/0051; H04L 5/0094; H04W 72/0446; H04W 72/046; H04W 72/23
    See application file for complete search history.

(56) References Cited

U.S. PATENT DOCUMENTS 10,651,910 B2    5/2020   Chen et al.
2018/0062807 A1*   3/2018   Seo ........................ H04W 16/14
    (Continued)

FOREIGN PATENT DOCUMENTS

CN     112822779 A     5/2021

OTHER PUBLICATIONS

"Support of QCL indication for aperiodic and multi-shot CSI-RS"; Samsung; 3GPP TSG RAN WG1 #87 R1-1612427 Reno, USA Nov. 14-18, 2016 (Year: 2016).*

(Continued)

*Primary Examiner* — Benjamin H Elliott, IV

(74) *Attorney, Agent, or Firm* — Dority & Manning, P.A.

(57) ABSTRACT

A method for determining a quasi-co-location (QCL) relationship, applied to a first node, including: acquiring indication information; determining the QCL relationship between a first reference signal and a second reference signal according to the indication information; where the indication information includes QCL association information, first time window information and second time window information; the QCL association information includes the first reference signal having the QCL relationship with the second reference signal, and a QCL type.

18 Claims, 10 Drawing Sheets

(56) References Cited

U.S. PATENT DOCUMENTS

| | | | |
|---|---|---|---|
| 2018/0287681 A1* | 10/2018 | Chen | H04B 7/0626 |
| 2019/0165880 A1* | 5/2019 | Hakola | H04L 1/1854 |
| 2019/0190672 A1* | 6/2019 | Kim | H04L 5/00 |
| 2019/0260532 A1* | 8/2019 | Manolakos | H04B 7/04 |
| 2021/0058212 A1* | 2/2021 | Si | H04W 72/23 |
| 2021/0195599 A1* | 6/2021 | Bai | H04L 5/0053 |
| 2021/0399861 A1* | 12/2021 | Hao | H04L 5/0078 |
| 2022/0006584 A1* | 1/2022 | Wu | H04W 72/0446 |
| 2022/0159479 A1* | 5/2022 | Si | H04L 5/0094 |
| 2022/0330042 A1* | 10/2022 | Liu | H04L 5/0053 |
| 2023/0188291 A1* | 6/2023 | Xu | H04L 5/0048 |
| | | | 370/329 |
| 2023/0189262 A1* | 6/2023 | Zeineddine | H04L 5/0048 |
| | | | 370/329 |
| 2023/0318688 A1* | 10/2023 | Huang | H04L 5/0051 |
| | | | 370/329 |
| 2024/0072874 A1* | 2/2024 | Ye | H04B 7/06968 |
| 2024/0080224 A1* | 3/2024 | Sun | H04B 7/18513 |

OTHER PUBLICATIONS

"QCL relations for different types of RS"; Samsung; 3GPP TSG RAN WG1 #87 R1-1612492 Reno, USA, Nov. 14-18, 2016 (Year: 2016).*

International Search Report and Written Opinion (with English translation) for PCT/CN2021/141204, mailed on Mar. 1, 2022.

Nokia, "BPL definition and Spatial QCL time indication", May 19, 2017, Hangzhou, China, 6 pages.

Extended European Search Report for corresponding Application No. 21914196.7, dated Nov. 6, 2024, 11 pages.

\* cited by examiner

QCL RELATIONSHIP DETERMINATION METHOD AND DEVICE, NODE, AND STORAGE MEDIUM

CROSS-REFERENCE TO RELATED APPLICATION(S)

This application is a national phase entry under 35 USC 371 of International Patent Application No. PCT/CN2021/141204 filed on Dec. 24, 2021, the International Patent Application is filed based on Chinese Patent Application with the application No. 202011633396.5, filed on Dec. 31, 2020, and claims priority to the Chinese Patent Application, the entire contents of the International Patent Application and the Chinese Patent Application are incorporated herein by reference.

TECHNICAL FIELD

The present application relates to the technical field of wireless communications, for example, to a method and device for determining a QCL relationship, a node and a storage medium.

BACKGROUND

When reference signals sent by two different antenna ports have a same large scale property parameter, the two antenna ports are defined as quasi-co-location (QCL). For example, a first reference signal and a second reference signal meet QCL, then large-scale property parameter(s) used by the second reference signal can refer to corresponding parameter(s) of the first reference signal.

SUMMARY

Embodiments of the present provide a method and device for determining a QCL relationship, a node and a storage medium, which aim to determine the QCL relationship between a first reference signal and a second reference signal according to QCL association information, first time window information and second time window information included in indication information.

The embodiments of the present application provide a method for determining a QCL relationship, applied to a first node, and the method includes:

acquiring indication information;

determining the QCL relationship between a first reference signal and a second reference signal according to the indication information;

where the indication information includes QCL association information, first time window information and second time window information;

the QCL association information includes the first reference signal having the QCL relationship with the second reference signal, and a QCL type.

The embodiments of the present application provide a method for determining a QCL relationship, applied to a second node, and the method includes:

configuring indication information;

sending the indication information;

where the indication information includes QCL association information, first time window information and second time window information;

the QCL association information includes a first reference signal having a QCL relationship with a second reference signal, and a QCL type.

The embodiments of the present application provide a device for determining QCL relationship, and the device includes:

an acquiring module, configured to acquire indication information;

a determining module, configured to determine the QCL relationship between a first reference signal and a second reference signal according to the indication information;

where the indication information includes QCL association information, first time window information and second time window information;

the QCL association information includes the first reference signal having the QCL relationship with the second reference signal, and a QCL type.

The embodiments of the present application provide a device for determining QCL relationship, where the device includes:

a configuring module, configured to configure indication information;

a sending module, configured to send the indication information;

where the indication information includes QCL association information, first time window information and second time window information;

the QCL association information includes a first reference signal having the QCL relationship with a second reference signal, and a QCL type.

The embodiments of the present application provide a communicating node, where the node includes a processor, and when the processor executes a computer program, the method for determining the QCL relationship provided in the embodiments of the application is implemented.

The embodiments of the present application provide a readable storage medium, configured as a computer storage. The storage medium stores one or more programs, and the one or more programs can be executed by the one or more processors, so as to realize the method for determining the QCL relationship.

The embodiments of the present application disclose a method and device for determining a QCL relationship, a node and a storage medium, where the method includes: acquiring indication information; determining the QCL relationship between a first reference signal and a second reference signal according to the indication information, where the indication information includes QCL association information, first time window information and second time window information, and the QCL association information includes the first reference signal having the QCL relationship with the second reference signal, and a QCL type. Through the above process, the determination of the QCL relationship between the first reference signal and the second reference signal according to the QCL association information, the first time window information and the second time window information included in the acquired indication information can be realized.

DETAILED DESCRIPTION

Figure 1:
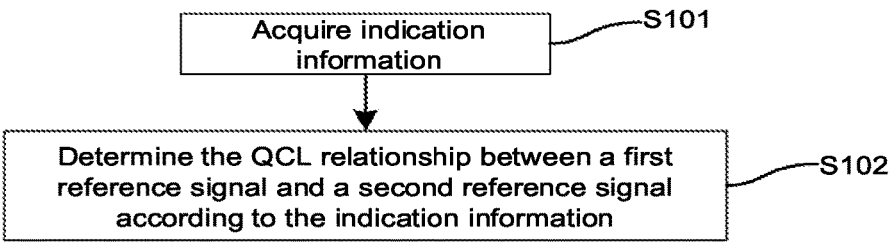
FIG. 1 is a flowchart of a method for determining a QCL relationship provided by an embodiment of the present application.

In future dense networks or large scale distributed networks or non-cellular networks, spatial distribution of access points (AP) in a given area is more dispersed than the centralized AP used by New Radio (NR), and the number of APs is relatively large, and multiple APs serve multiple user equipments (UE) simultaneously. Therefore, when a UE moves in the area or an AP/UE joins/exits cooperative transmission, a serving AP set of a specific UE may change, an interference situation further changes, and a corresponding demodulation reference signal also needs to be adjusted.

In this situation, the QCL relationship between the first reference signal and the second reference signal specified in the related art cannot guarantee correct demodulation of the second reference signal, and a time range of that the first reference signal and the second reference signal may have a QCL relationship, and a time range that the second reference signal adopts large scale property parameter(s) of the first reference signal are not specified in the related art.

The embodiments of the present application will be described in detail below with reference to the accompanying drawings. It should be noted that, in the case of no conflict, the embodiments in the present application and the features in the embodiments can be combined arbitrarily with each other.

In order to facilitate a clearer understanding of the solutions provided by the embodiments of the present application, relevant concepts involved in the embodiments of the present application are explained herein, which are specifically as follows.

NR defines a dedicated demodulation reference signal (DMRS), a channel state information reference signal (CSI-RS), a phase tracking reference signal (PTRS), a synchronization signal/physical broadcast channel block (SSB). These different reference signals have different usages. For example, DMRS can be used to demodulate a physical downlink shared channel (PDSCH) and physical downlink control channel (PDCCH), CSI-RS for tracking can be used to detect and adjust time-frequency offset, CSI-RS for L1-RSRP computation is used for beam management, CSI-RS for mobility is used for mobility management, and CSI-RS for CSI acquisition is used for acquisition of channel state information (CSI) acquisition, PTRS is used to estimate phase noise, and SSB is used for synchronization. Different reference signals are sent through different antenna ports, and although different reference signals may be sent by different transmitting antennas, these different reference signals may have the same large scale properties. For example, different antennas of a site may have the same or similar large scale property parameters, such as Doppler shift, Doppler spread, average delay, delay spread and Spatial Rx parameter, etc. For receiving antenna(s) of the same UE, upon receiving reference signals from different transmitting antennas of the same AP, at least the same or similar average delay can be assumed, based on which a receiving side can further improve channel estimation accuracy. When two different antenna ports have the same large scale property parameter(s), the two ports are called QCL, where the QCL further correlates the reference signals sent by different antenna ports.

Four different QCL types are defined in the NR protocol, namely:

QCL Type A: {Doppler shift, Doppler spread, average delay, delay spread}

QCL Type B: {Doppler shift, Doppler spread}

QCL Type C: {Doppler shift, average delay}

QCL Type D: {Spatial Rx parameter}

Different QCL types correspond to different sets of large scale property parameters. Each QCL type indicates which large scale property parameter(s) can be shared by different reference signals. For example, DMRS of PDSCH and SSB are QCL type A, which means that DMRS of PDSCH and SSB have the same Doppler shift, Doppler spread, average delay and delay spread, and thus, Doppler shift, Doppler spread, average delay, delay spread of SSB can be used upon demodulating DMRS.

Dense multiple-input multiple-output (Dense MIMO), Distributed multiple-input multiple-output (Distributed MIMO) and Cell-free massive multiple-input multiple-output (Cell-Free Massive MIMO), as potential key technical points in the multi-antenna direction of the beyond fifth generation (B5G)/6th generation (6G), have attracted more and more attention. A notable feature of this technology is that the spatial distribution of APs in a given area is more dispersed than the centralized AP used by NR, and the number of APs is relatively large, and multiple APs serve multiple UEs simultaneously. Therefore, when a UE moves in the area, or an AP/UE joins/exits cooperative transmission, a serving AP set of a specific UE may change, an interference situation further changes, and a corresponding demodulation reference signal needs to be adjusted. For example, the base station indicates that the first reference signal and the second reference signal meet a QCL relationship, but it cannot be guaranteed that the second reference signal can be correctly demodulated. In related art, different sensitivities of different large scale property parameters to time changes are not considered to indicate a time range of the large scale property parameters of the second reference signal with reference to the first reference signal. Also, when the first reference signal or the second reference signal is a periodic signal, how to indicate the QCL relationship between the two reference signals is not considered.

Based on the above concepts and existing technical defects, the embodiments of the present application provide a method for determining a QCL relationship, which can be applied to a first node (for example, a UE, a terminal device, etc.). As shown in FIG. 1, the method may include but is not limited to the following steps.

S101: acquiring indication information.

Exemplarily, the indication information may include QCL association information, first time window information and second time window information delivered by a base station side. The QCL association information may include a first reference signal having the QCL relationship with a second reference signal, and a QCL Type.

It can be understood that the QCL Type may include at least one of QCL type A, QCL type B, QCL type C, and QCL type D.

The first reference signal can be understood as a source signal, and the second reference signal can be understood as a target signal, that is, the second reference signal can refer to the measurement result of the large scale property parameter(s) of the first reference signal according to the QCL relationship between the first reference signal and the second reference signal.

The first time window information is used to determine a first limiting condition that the first reference signal has the QCL relationship with the second reference signal, and the second time window information is used to determine a second limiting condition that the second reference signal has the QCL relationship with the first reference signal.

S102: determining the QCL relationship between the first reference signal and the second reference signal according to the indication information.

Since the indication information delivered by the base station contains the QCL association information, the first time window information, and the second time window information, the QCL relationship between the first reference signal and the second reference signal can be determined by the first node according to the content contained in the indication information.

The first reference signal and the second reference signal having the QCL relationship can be understood as the first reference signal and the second reference signal simultaneously meeting the first limiting condition and the second limiting condition mentioned above.

The embodiments of the present application provide a method for determining a QCL relationship. The method includes: acquiring indication information; determining the QCL relationship between a first reference signal and a second reference signal according to the indication information; where the indication information includes QCL association information, first time window information and second time window information, and the QCL association information includes the first reference signal having the QCL relationship with the second reference signal, and a QCL type. Through the above process, the determination of the QCL relationship between the first reference signal and the second reference signal according to the QCL association information, the first time window information and the second time window information included in the acquired indication information can be realized.

For example, the above-mentioned first reference signal may include any one of SSB, CSI-RS, and DMRS, and the second reference signal may include any one of DMRS, CSI-RS, and PTRS.

In an example, the above first time window information includes a first time reference point and a first window length, where the first time window information is used to determine a first limiting condition that the first reference signal has the QCL relationship with the second reference signal.

The first time reference point includes a receiving timepoint of a signaling indicating that the first reference signal has the QCL relationship with the second reference signal, or the first time reference point includes a timepoint when the large scale property parameter(s) of the second reference signal is/are determined.

The second time window information includes a second time reference point and a second window length, where the second time window information is used to determine a second limiting condition that the second reference signal has the QCL relationship with the first reference signal.

The second time reference point includes a receiving timepoint of a signaling indicating that the second reference signal has the QCL relationship with the first reference signal, or the second time reference point includes a beginning or ending timepoint of the nth symbol or the nth time slot of the first reference signal, where n is a positive integer less than the number of symbols or time slots occupied by the first reference signal.

In an example, in a case where the first reference signal includes a periodic signal, the second time reference point in the above examples may include a beginning or ending timepoint specifying the nth symbol or the nth time slot of the kth period of the first reference signal; where n is a positive integer less than the number of symbols or time slots occupied by the first reference signal in one period, and k is a positive integer.

Figure 2:
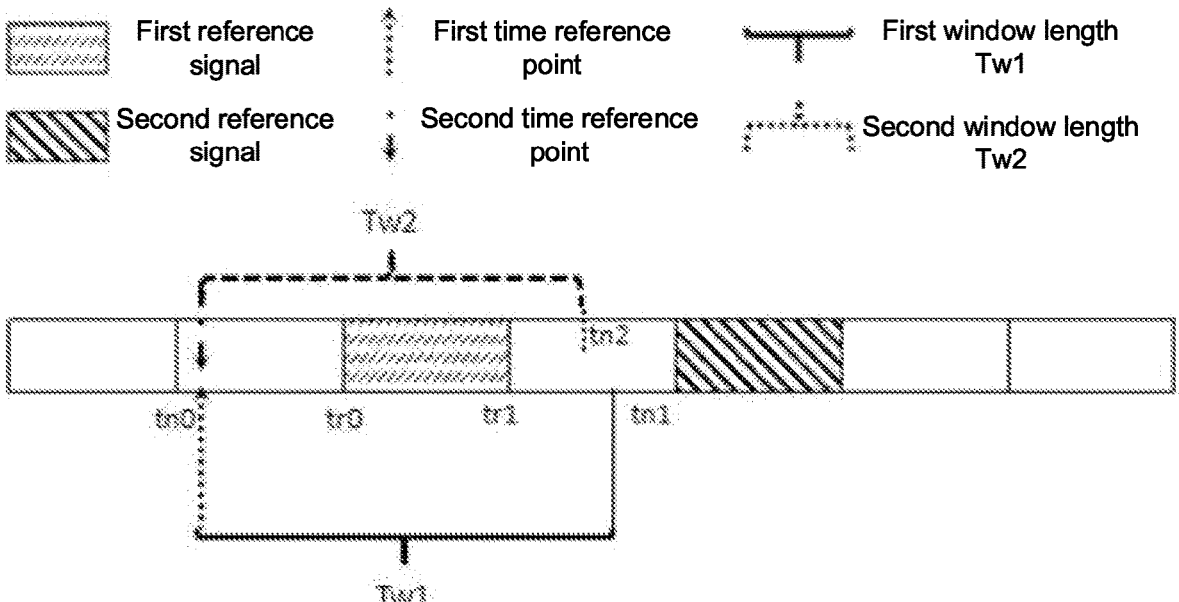
FIG. 2 is a schematic diagram of a type of first time window information and second time window information provided by an embodiment of the present application.

As shown in FIG. 2, the first time reference point and the second time reference point are both tn0, the first window length and the second window length are Tw1 and Tw2 respectively, a time range of the first reference signal is tr0~tr1, a time range agreed by the first time window information is tn0~tn1, and a time range agreed by the second time window information is tn0~tn2. Since the first reference signal is within the time ranges agreed by the first time window information and the second time window information, then a time range where the second reference signal may refer to the large scale property parameter(s) corresponding to the first reference signal is tr0~tr1.

Figure 3:
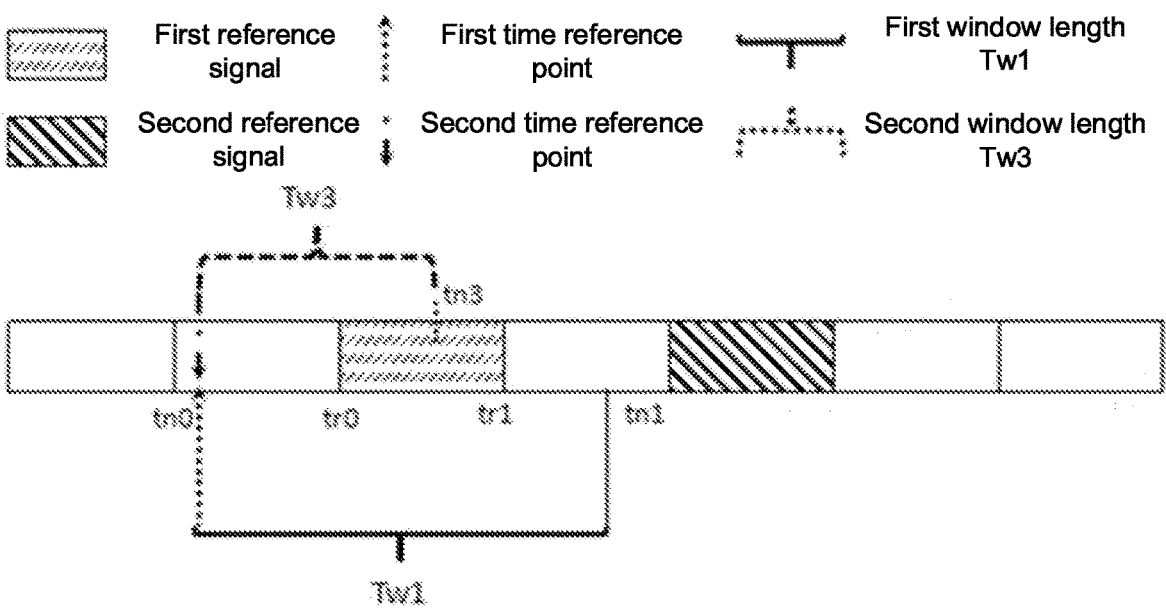
FIG. 3 is a schematic diagram of another type of first time window information and second time window information provided by an embodiment of the present application.

As shown in FIG. 3, the first time reference point and the second time reference point are both tn0, the first window length and the second window length are Tw1 and Tw3 respectively, a time range of the first reference signal is tr0~tr1, a time range agreed by the first time window is tn0~tn1, a time range agreed by the second time window information is tn0~tn3. Since the first reference signal is all within the time range agreed by the first time window information, but only part of the first reference signal is within the time range agreed by the second time window information, then a time range where the second reference signal refers to the large scale property parameter(s) corresponding to the first reference signal is tr0~tn3.

Figure 4:
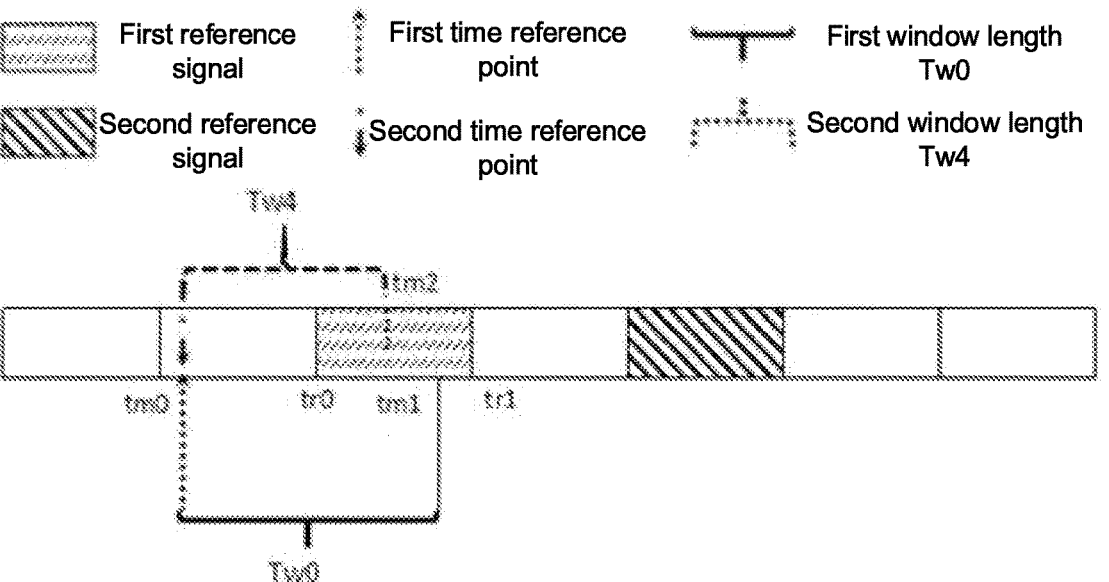
FIG. 4 is a schematic diagram of still another type of first time window information and second time window information provided by an embodiment of the present application.

As shown in FIG. 4, the first time reference point and the second time reference point are both tn0, the first window length and the second window length are Tw0 and Tw4 respectively, a time range of the first reference signal is tr0~tr1, a time range agreed by the first time window is tm0~tm1, a time range agreed by the second time window information is tm0~tm2. Since only part of the first reference signal is within the time ranges agreed by the first time window information and the second time window information, then a time range where the second reference signal refers to the large scale property parameter(s) corresponding to the first reference signal is tr0~tm2.

A unit of the above-mentioned second window lengths can be a number of symbol, a number of time slot, a number of sub-frame, a number of frame, a second, a millisecond, a microsecond, etc. In addition, there can be many different configurations for a second window length to achieve differentiated configurations in different scenarios.

For example, the second window length can be configured differently according to different large scale property parameters. For example, different second window lengths for Doppler shift, Doppler spread, average delay, delay spread, and Spatial Rx parameter are configured respectively, and the second window lengths for different large scale property parameters meet a certain quantitative relationship.

Figure 5:
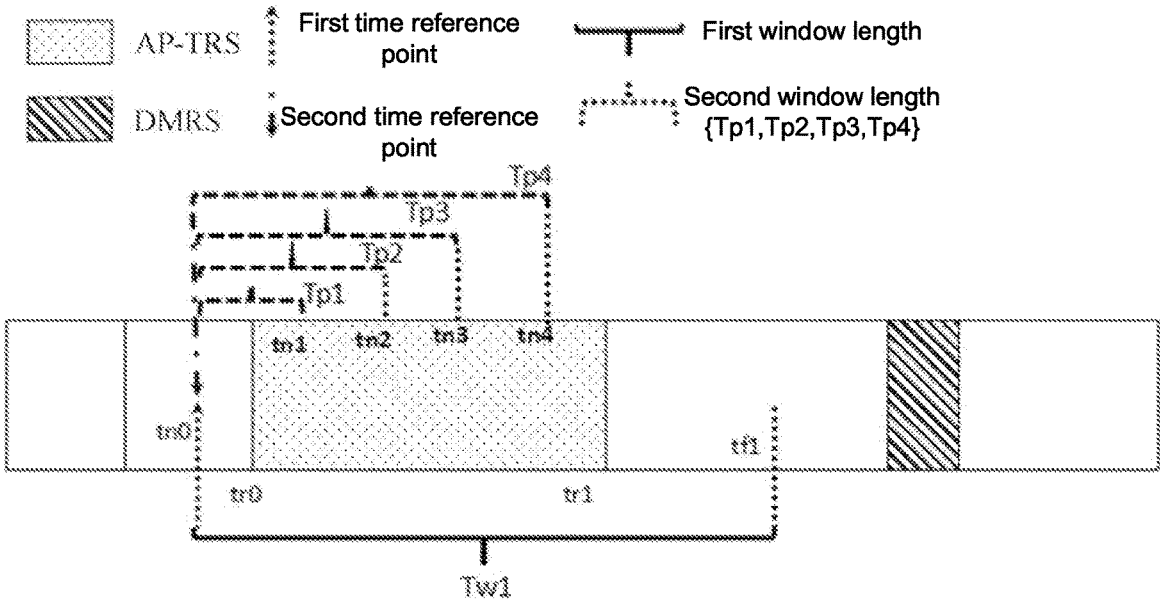
FIG. 5 is a schematic diagram of an association of a second window length and different large scale property parameters provided by an embodiment of the present application.

As shown in FIG. 5, the base station indicates that DMRS and aperiodic CSI-RS for tracking (AP-TRS) meet a QCL type A relationship, and four different second window lengths configured for Doppler shift, Doppler spread, average delay, and delay spread are Tp1, Tp2, Tp3, Tp4, respectively, where Tp1<Tp2<Tp3<Tp4. The first time reference point and the second time reference point are both tn0, the first window length is Tw1, a time range of AP-TRS is tr0~tr1, a time range agreed by the first time window information is tn0~tf1, time ranges agreed by the four different second time window information are tn0~tn1, tn0~tn2, tn0~tn3, tn0~tn4 respectively. Thus, when DMRS needs to use parameters such as Doppler shift, Doppler spread, average delay, and delay spread, time ranges that can be referred to AP-TRS are tr0~tn1, tr0~tn2, tr0~tn3, and tr0~tn4.

Figure 6:
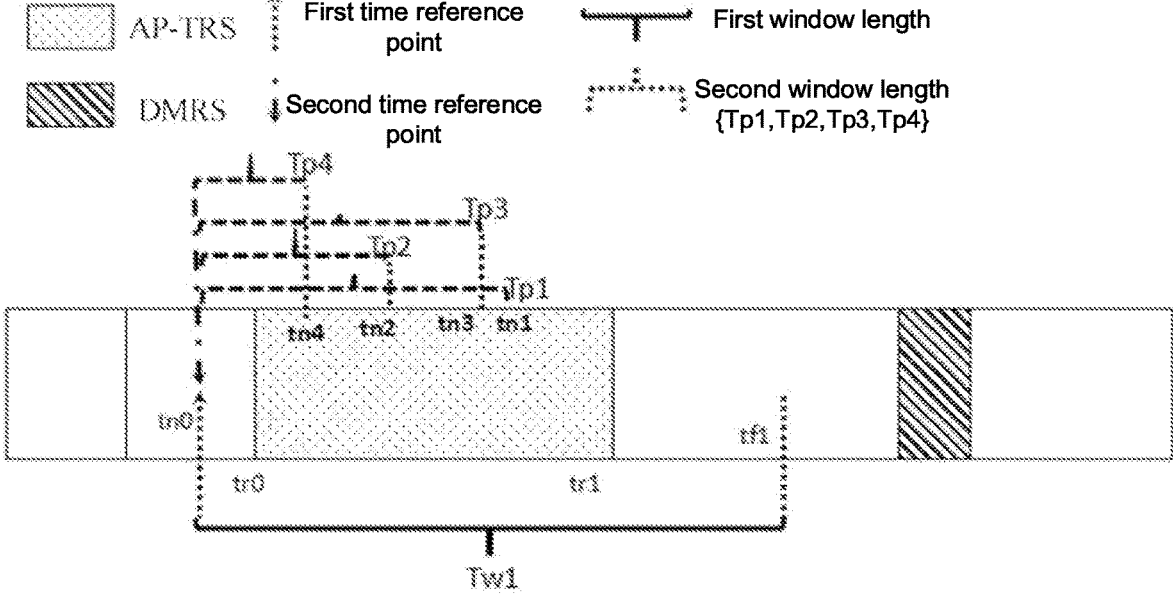
FIG. 6 is a schematic diagram of another association of a second window length and different large scale property parameters provided by an embodiment of the present application.

Of course, the second window lengths of the above-mentioned different large scale property parameters are not necessarily in an incrementing relationship according to the corresponding order of Doppler shift, Doppler spread, average delay, and delay spread, and may have other relationships. For example, the base station can indicate that DMRS and AP-TRS meet a QCL type A relationship and that four different second window lengths configured for Doppler shift, Doppler spread, average delay, and delay spread are Tp1, Tp2, Tp3, Tp4, respectively, where Tp4<Tp2<Tp3<Tp1, as shown in FIG. 6.

For example, the second window lengths can also be differentially configured according to different large scale property parameter sets. For example, when different large scale property parameters are grouped, large scale property parameter(s) in a same set have a same second window length, large scale property parameters between different sets have different second window lengths, and the second window lengths of different sets meet a certain quantitative relationship. For example, large scale property parameters can be divided into three sets according to {Doppler shift, Doppler spread}, {average delay, delay spread}, {Spatial Rx parameter}, and different second window lengths can be configured for the above three sets. Of course, the number of the sets and elements of the above three sets involved in this grouping manner are not unique, and are only for demonstration.

Figure 7:
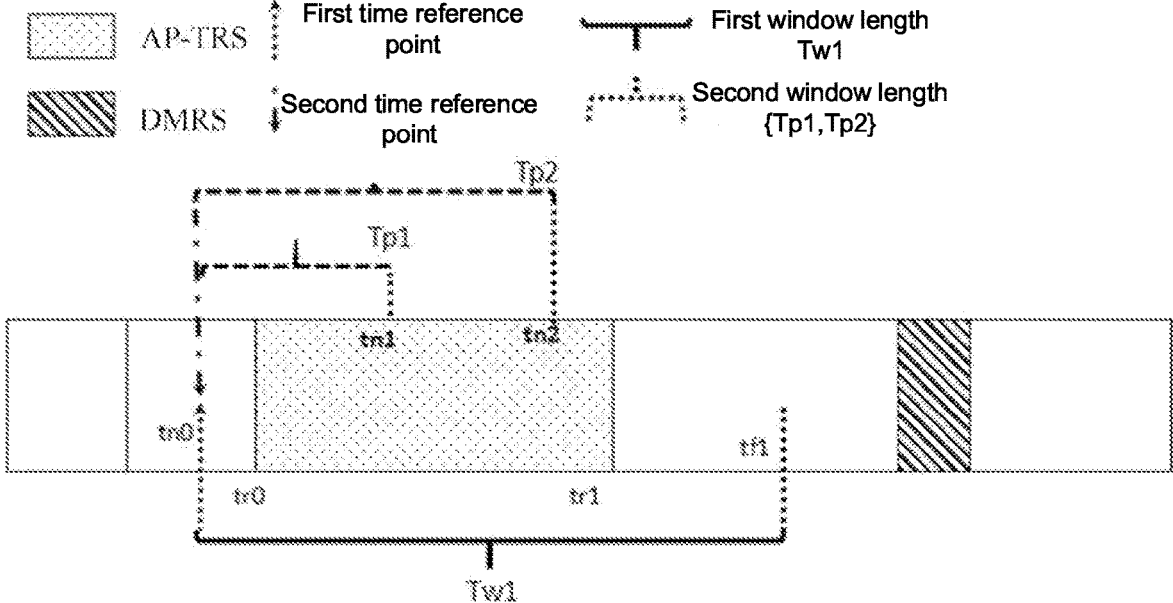
FIG. 7 is a schematic diagram of still another association of a second window length and different large scale property parameter sets provided by an embodiment of the present application.

As shown in FIG. 7, the base station indicates that DMRS and aperiodic CSI-RS for tracking (AP-TRS) meet a QCL type A relationship, and second window lengths configured for Doppler shift, Doppler spread, average delay, and delay spread are Tp1, Tp1, Tp2, Tp2, respectively, where Tp1<Tp2. The first time reference point and the second time reference point are both tn0, the first window length is Tw1, a time range of AP-TRS is tr0~tr1, a time range agreed by the first time window information is tn0~tf1, and two time ranges agreed by the second time window information are tn0~tn1 and tn0~tn2, respectively. Thus, when DMRS needs to use parameters such as Doppler shift, Doppler spread, average delay, and delay spread, time ranges that can be referred to TRS are tr0~tn1, tr0~tn1, tr0~tn2, tr0~tn2.

For example, the second window lengths can also be configured differentially according to different QCL types. For example, different second window lengths are configured for QCL type A, QCL type B, QCL type C, and QCL type D, respectively, and second window lengths of different QCL types meet a certain quantitative relationship.

Different QCL types may be two different QCL types of the same first reference signal that has a QCL relationship with the second reference signal, or may be QCL types of two different first reference signals that have a QCL relationship with the second reference signal, or the different QCL types is a QCL type of the same first reference signal that has a QCL relationship with two different second reference signals.

If the above different QCL types are QCL types of two different first reference signals that have a QCL relationship with the second reference signal, or two different QCL types of a same first reference signal that has a QCL relationship with the second reference signal type, then no matter whether the two QCL types are the same, they are considered different.

Figure 8:
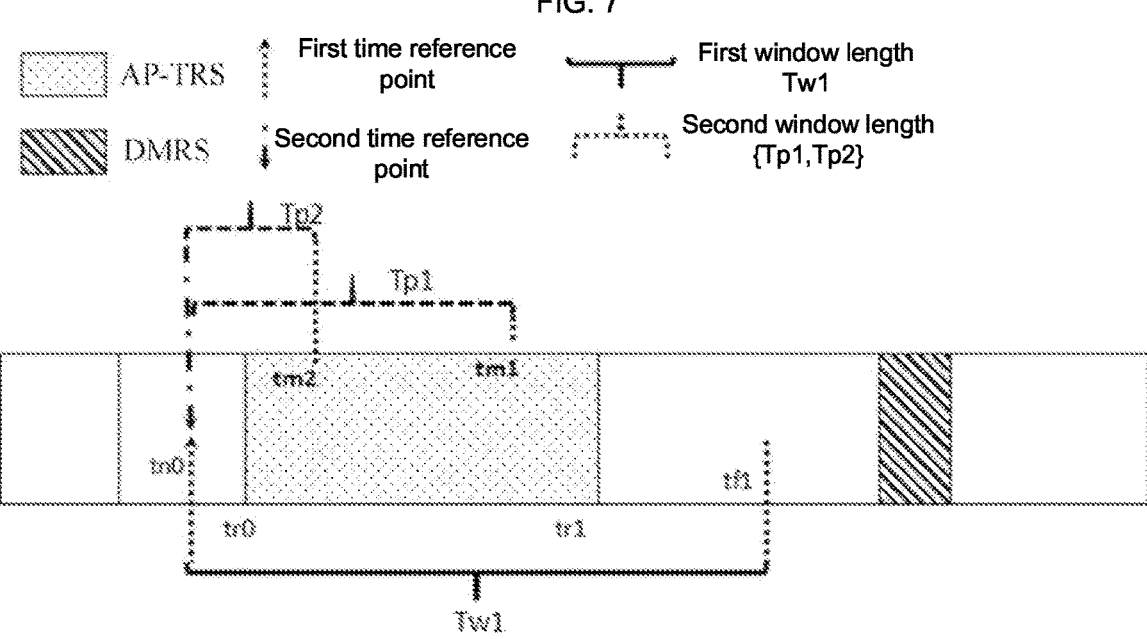
FIG. 8 is a schematic diagram of an association of a second window length and different QCL types provided by an embodiment of the present application.

As shown in FIG. 8, the base station indicates that DMRS and aperiodic CSI-RS for tracking (AP-TRS) meet a QCL type A relationship and a QCL type D relationship simultaneously, and two different second window lengths Tp1, Tp2 are configured for QCL type A and QCL type D, respectively, then second window lengths of Doppler shift, Doppler spread, average delay, delay spread, Spatial Rx parameter are Tp1, Tp1, Tp1, Tp1, Tp2, respectively, where Tp1>Tp2. In an example, the first time reference point and the second time reference point are both tn0, the first window length is Tw1, a time range of the AP-TRS is tr0~tr1, and a time range agreed by the first time window information is tn0~tf1, and time ranges agreed by the two different pieces of second time window information are tn0~tm1 and tn0~tm2 respectively. Thus, when DMRS needs to use parameters such as Doppler shift, Doppler spread, average delay, delay spread, and Spatial Rx parameter, time ranges that can be referred to AP-TRS are tr0~tm1, tr0~tm1, tr0~tm1, tr0~tm1, and tr0~tm2, respectively.

Figures 9, 10:
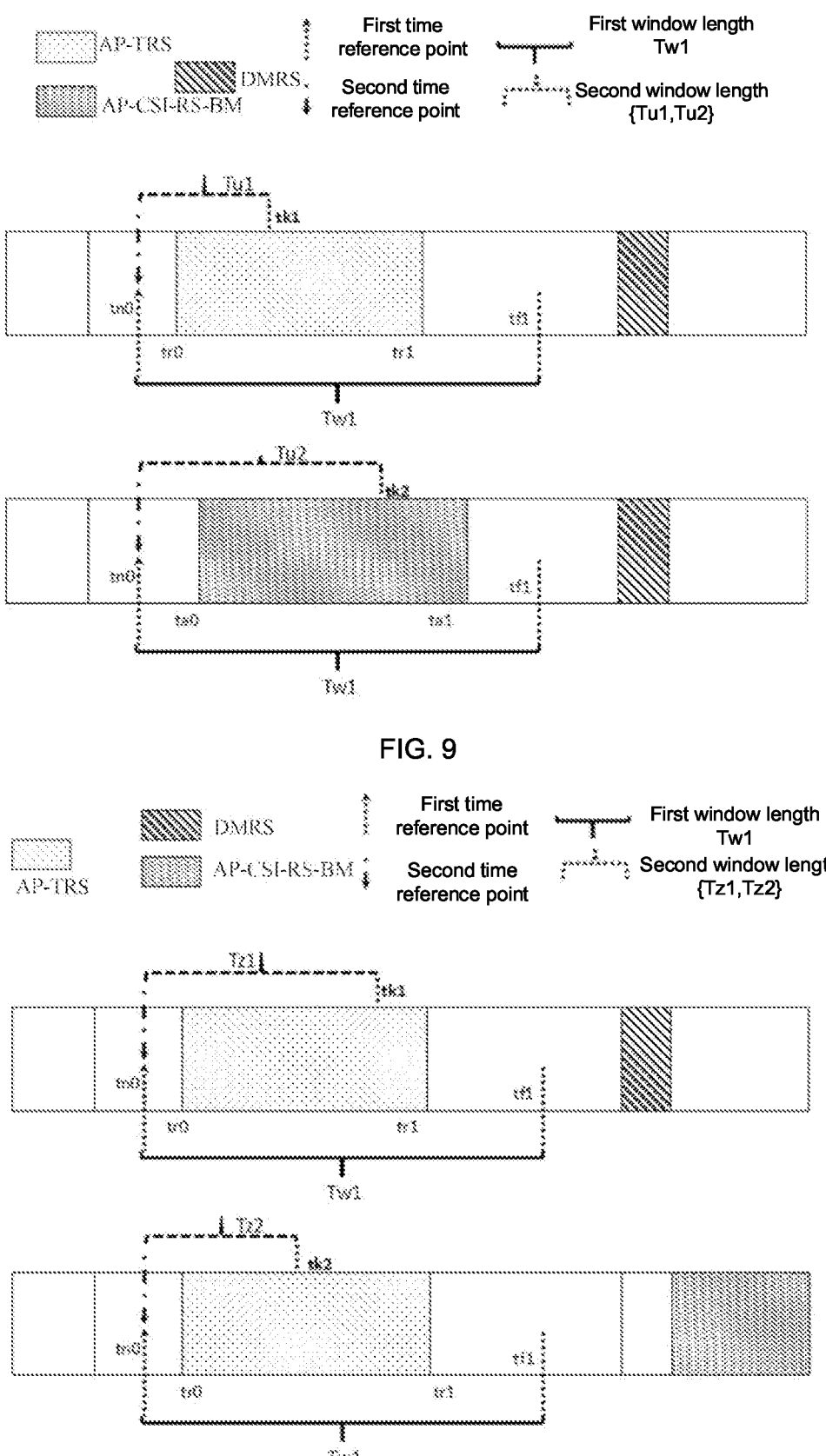
FIG. 9 is a schematic diagram of another association of a second window length and different QCL types provided by an embodiment of the present application.
FIG. 10 is a schematic diagram of still another association of a second window length and different QCL types provided by an embodiment of the present application.

As shown in FIG. 9, the base station indicates that DMRS meets a QCL type A relationship and a QCL type D relationship with aperiodic CSI-RS for tracking (AP-TRS) and aperiodic CSI-RS for L1-RSRP computation (AP-CSI-RS-BM), respectively, and two different second window lengths Tu1 and Tu2 are configured for QCL type A and QCL type D, then second window lengths of Doppler shift, Doppler spread, average delay, delay spread and Spatial Rx parameter are Tu1, Tu1, Tu1, Tu1, Tu2, respectively, where Tu1<Tu2. In an example, the first time reference point and the second time reference point are both tn0, the first window length is Tw1, time ranges of AP-TRS and AP-CSI-RS-BM are tr0~tr1, ta0~ta1, respectively, and a time range agreed by the first time window information is tn0~tf1, and time ranges agreed by two different pieces of second time window information are tn0~tk1 and tn0~tk2, respectively. Thus, when DMRS needs to use parameters such as Doppler shift, Doppler spread, average delay, and delay spread, time ranges that are referred to AP-TRS are all tr0~tk1, and when DMRS needs to use a Spatial Rx parameter, a time range that can be referred to AP-CSI-RS-BM is ta0~tk2.

As shown in FIG. 10, the base station indicates that DMRS, aperiodic CSI-RS for L1-RSRP computation (AP-CSI-RS-BM) and aperiodic CSI-RS for tracking (AP-TRS) all meet a QCL type A relationship, and two different second window lengths Tz1 and Tz2 are configured, then in two different situations, second window lengths of Doppler shift, Doppler spread, average delay, and delay spread are all Tz1 or Tz2, where Tz1>Tz2. Assuming that the first time reference point and the second time reference point are both tn0, the first window length is Tw1, a time range of the AP-TRS is tr0~tr1, a time range agreed by the first time window information is tn0~tf1, and time ranges agreed by two pieces of second time window information are tn0~tk1 and tn0~tk2, respectively. Thus, when DMRS needs to use parameters such as Doppler shift, Doppler spread, average delay, and delay spread, time ranges that are referred to AP-TRS are all tr0~tk1, and when AP-CSI-RS-BM needs to use parameters such as Doppler shift, Doppler spread, average delay, time ranges that are referred to AP-TRS are all tr0~tk2.

For example, the above-mentioned second window lengths may also be configured differentially according to a periodic property of the first reference signal or the second reference signal. For example, the base station indicates that periodic CSI-RS for CSI acquisition (P-CSI-RS-CSI) and periodic CSI-RS for tracking (P-TRS) meet a QCL type A relationship, then the second window lengths can be associated with a period of P-CSI-RS-CSI or a period of P-TRS.

Figures 11, 12:
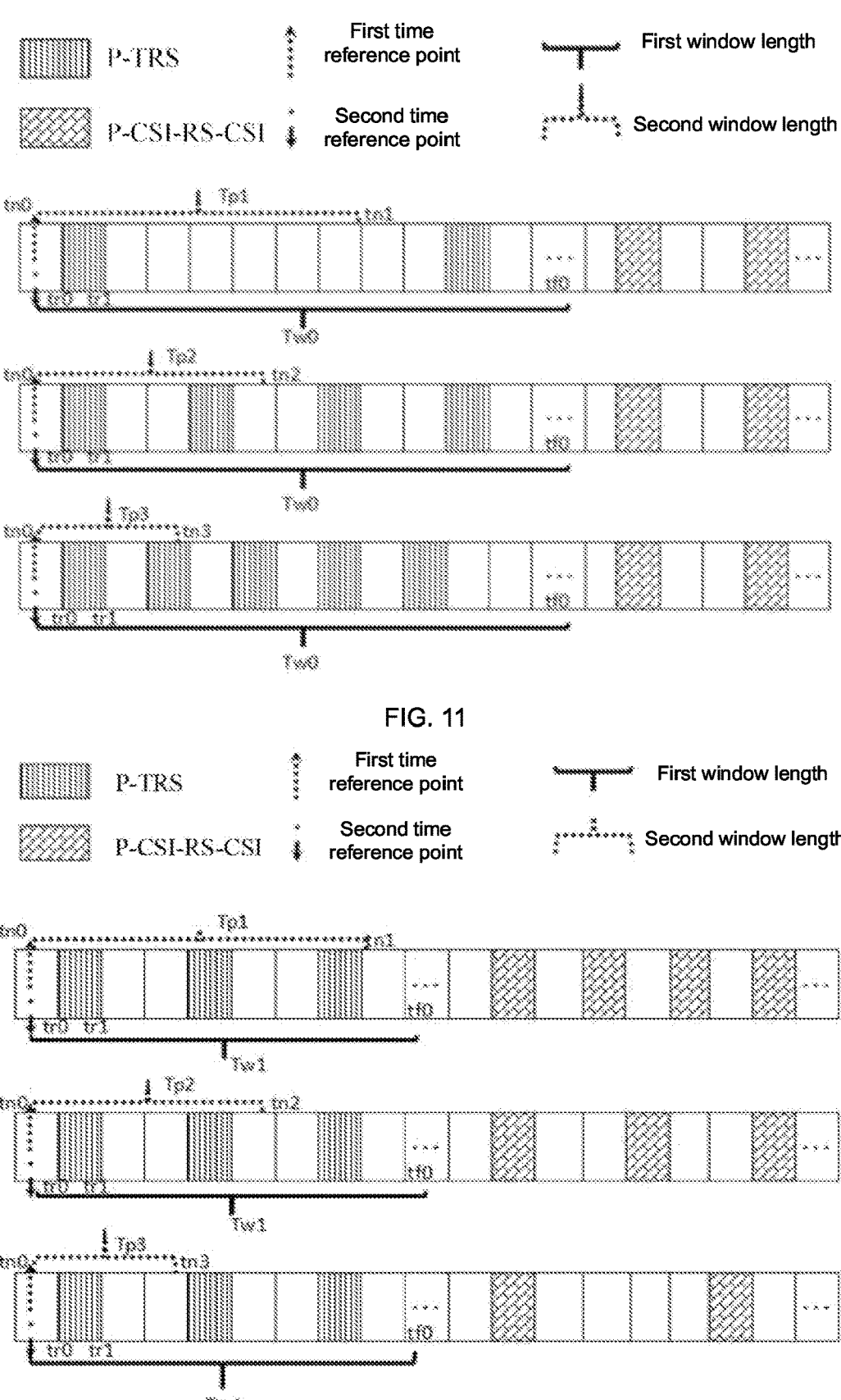
FIG. 11 is a schematic diagram of a first association of a second window length and a signal period provided by an embodiment of the present application.
FIG. 12 is a schematic diagram of a second association of a second window length and a signal period provided by an embodiment of the present application.

As shown in FIG. 11, the base station configures both the first time reference point and the second time reference point as tn0, the first window length is Tw0, and a time range agreed by the first time window information is tn0~tf0. Three different P-TRS periods are 8*Tp_base, 2*Tp_base, Tp_base, respectively, a time domain range of the P-TRS in the first period is tr0~tr1, and the second window lengths are Tp1, Tp2, Tp3 respectively, three time ranges agreed by the second time window information are tn0~tn1, tn0~tn2, and tn0~tn3, respectively. P-CSR-RS-CSI period is 2*Td_base. The Tp_base and Td_base are reference periods of P-TRS and P-CSR-RS-CSI, respectively, where Tp1>Tp2>Tp3. Thus, under the configuration of the P-TRS with three different periods, when CSI-RS-CSI needs to use parameters such as Doppler shift, Doppler spread, average delay, delay spread, etc., time ranges that are referred to P-TRS with three different periods are tr0-tn1, tr0-tn2, tr0-tn3, respectively.

Time domain ranges of different periodic P-TRS to which can be referred under different second time windows are different. It can be seen from the figure (i.e., FIG. 11) that when periods of P-TRS are 8*Tp_base, 2*Tp_base, and Tp_base, P-TRS that can be used to determine large scale property parameter(s) of P-CSI-RS-CSI within a time range agreed by the corresponding second time window information has complete TRS information in one period, complete TRS information in two periods, complete TRS information in one period plus partial TRS information in one period, respectively.

Similarly, as shown in FIG. 12, the base station configures both the first time reference point and the second time reference point as tn0, the first window length is Tw1, and a time range agreed by the first time window information is tn0~tf0. A period of P-TRS period is 2*Tp_base, and time domain range of P-TRS in the first period is tr0~tr1. Three different P-CSR-RS-CSI periods are Td_base, 2*Td_base, and 4*Td_base, respectively, the second window lengths are Tp1, Tp2, and Tp3, respectively, and time ranges agreed by the second time window information are tn0~tn1, tn0~tn2, tn0~tn3, respectively, where Tp_base and Td_base are reference periods of P-TRS and P-CSR-RS-CSI, respectively, where Tp1>Tp2>Tp3. Thus, under the configuration of P-TRS with the same period, CSI-RS-CSI with three different periods needs to use parameters such as Doppler shift, Doppler spread, average delay, and delay spread, time ranges of P-TRS to which can be referred are tr0~tn1, tr0~tn2, tr0~tn3, respectively. Time domain ranges of the periodic P-TRS to which can be referred under different second time windows are different. It can be seen from FIG. 12 that when periods of P-CSI-RS-CSI are Td_base, 2*Td_base, 4*Td_base, P-TRS that can be used to determine large scale property parameter(s) within a time range of P-CSI-RS-CSI agreed by the corresponding second time window information has complete TRS information in three periods, complete TRS information in two periods, complete TRS information in one period, respectively.

The base station indicates that semi-persistent CSI-RS for CSI acquisition (SP-CSI-RS-CSI) and P-TRS meet a QCL type A relationship, and thus, the second window lengths can be associated with a period of P-TRS.

Figures 13, 14:
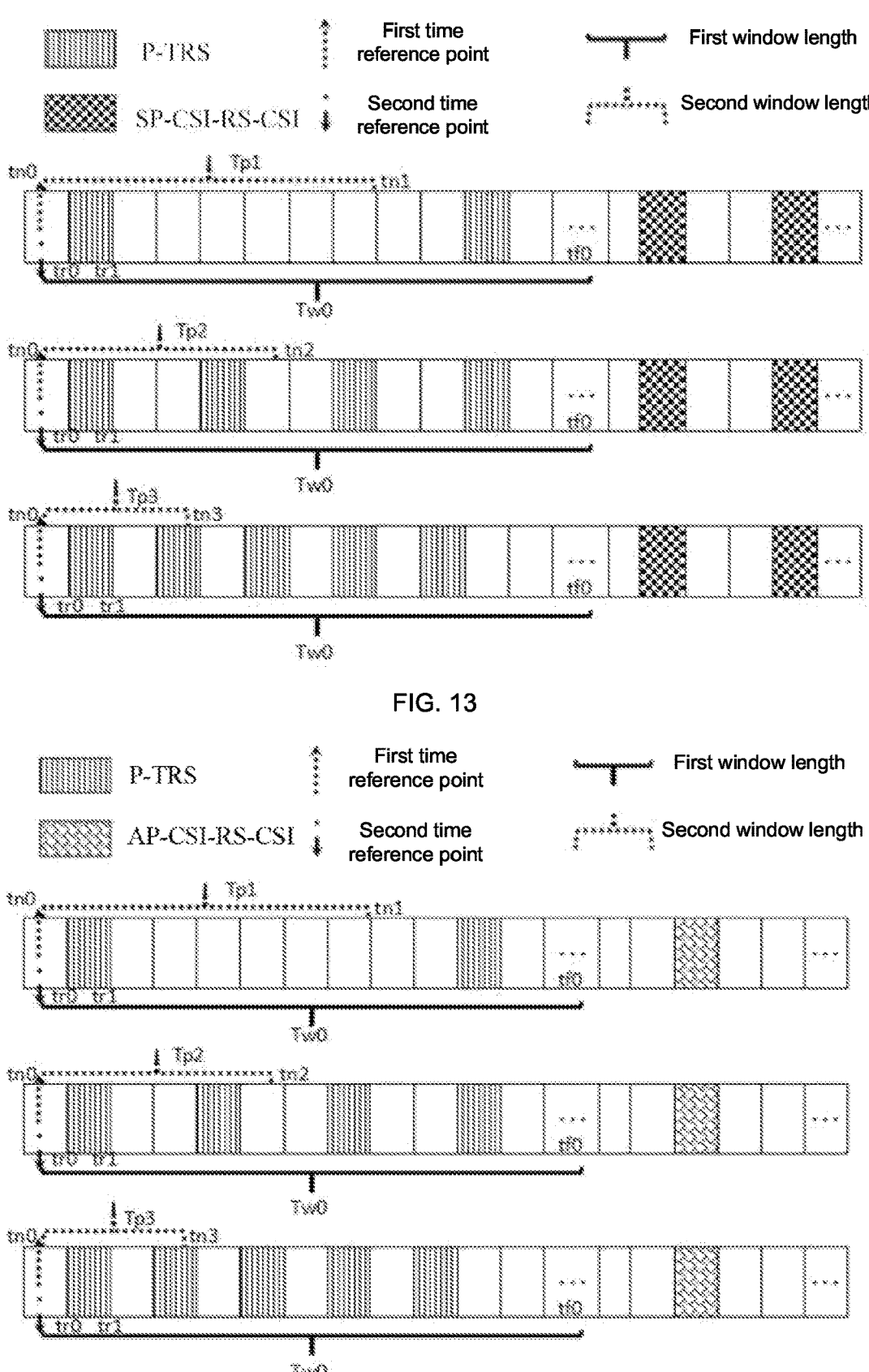
FIG. 13 is a schematic diagram of a third association of a second window length and a signal period provided by an embodiment of the present application.
FIG. 14 is a schematic diagram of a fourth association of a second window length and a signal period provided by an embodiment of the present application.

As shown in FIG. 13, the base station configures both the first time reference point and the second time reference point as tn0, the first window length is Tw0, and a time range agreed by the first time window information is tn0~tf0. Three different P-TRS periods are 8*Tp_base, 2*Tp_base, Tp_base, respectively, a time domain range of P-TRS in the first period is tr0~tr1, and the second window lengths are Tp1, Tp2, Tp3, respectively, time ranges agreed by the second time window information are tn0~tn1, tn0~tn2, and tn0~tn3, respectively. A period of SP-CSR-RS-CSI is 2*Td_base, where Tp_base and Td_base are reference periods of P-TRS and SP-CSR-RS-CSI, respectively, where Tp1>Tp2>Tp3. Thus, under the configuration of the P-TRS with three different periods, when SP-CSI-RS-CSI needs to use parameters such as Doppler shift, Doppler spread, average delay, delay spread, etc., time ranges of P-TRS with three different periods to which can be referred are tr0~tn1, tr0~tn2, tr0~tn3, respectively.

Time domain ranges of different periodic P-TRS to which can be referred under different second time windows are different. It can be seen from the figure (i.e., FIG. 13) that when periods of P-TRS are 8*Tp_base, 2*Tp_base, and Tp_base, P-TRS that can be used to determine large scale property parameter(s) of SP-CSI-RS-CSI within a time range agreed by the corresponding second time window information has complete TRS information in one period, complete TRS information in two periods, complete TRS information in one period plus partial TRS information in one period.

The base station indicates that aperiodic CSI-RS for CSI acquisition (AP-CSI-RS-CSI) and P-TRS meet a QCL type A relationship, and thus, the second window lengths can be associated with a period of P-TRS.

As shown in FIG. 14, the base station configures both the first time reference point and the second time reference point as tn0, the first window length is Tw0, and a time range agreed by the first time window information is tn0~tf0. Three different P-TRS periods are 8*Tp_base, 2*Tp_base, Tp_base, respectively, a time domain range of P-TRS in the first period is tr0~tr1, and the second window lengths are Tp1, Tp2, Tp3, respectively, time ranges agreed by the second time window information are tn0~tn1, tn0~tn2, and tn0~tn3, respectively, where Tp_base is a reference period of P-TRS, where Tp1>Tp2>Tp3. Thus, under the configuration of the P-TRS with three different periods, when AP-CSI-RS-CSI needs to use parameters such as Doppler shift, Doppler spread, average delay, and delay spread, a time range of P-TRS with three different periods to which can be referred are tr0~tn1, tr0~tn2, tr0~tn3, respectively. Time domain ranges of different periodic P-TRS to which can be referred under different second time windows are different. It can be seen from the figure (i.e., FIG. 14) that when periods of P-TRS periods are 8*Tp_base, 2*Tp_base, and Tp_base, P-TRS that can be used to determine large scale property parameter(s) of AP-CSI-RS-CSI within a time range agreed by the corresponding second time window information has complete TRS information in one period, complete TRS information in two periods, complete TRS information in one period plus partial TRS information in one period.

That is, a second window length may be associated with at least one of the factors, i.e., a large scale property parameter, a large scale property parameter set, a QCL type, and a period of a reference signal, where the reference signal may be the first reference signal, or the reference signal may be the second reference signal.

For example, in a case where both the first reference signal and the second reference signal are periodic signals, the second window length may be associated with a period of the first reference signal, or may also be associated with a period of the second reference signal; in a case where the first reference signal is a periodic signal and the second reference signal is an aperiodic signal or a semi-persistent signal, the second window length may be associated with a period of the first reference signal.

In an example, association relationships between the second window length and factors (i.e., a large scale property parameter, a large scale property parameter set, a QCL type, and a period of a reference signal), may meet a certain functional relationship, where the functional relationship may include a positive correlation or a negative correlation.

Figure 15:
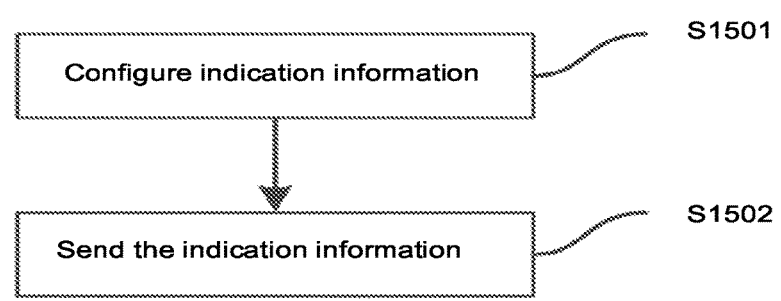
FIG. 15 is a flowchart of a method for determining a QCL relationship provided by an embodiment of the present application.

FIG. 15 is a flow chart of a method for determining a QCL relationship provided by an embodiment of the present application. The method may be applied to a second node (e.g., a base station). As shown in FIG. 15, the method may include but is not limited to the following steps.

S1501: configuring indication information.

The indication information in this step may include QCL association information, first time window information, and second time window information, where the QCL association information includes a first reference signal having the QCL relationship with a second reference signal, and a QCL type. The first time window information includes a first time reference point and a first window length, and the second time window information includes a second time reference point and a second window length.

In the embodiment of the present application, the second node can configure the indication information (or the second window length in the indication information) by virtue of static configuration, or the base station indicates the second window length by virtue of dynamic signaling after a set of parameter sets is configured, or the base station may jointly determine, with the first node, the second window length after a set of parameter sets is configured.

S1502: sending the indication information.

After the second node configures the indication information, the indication information can be sent to the first node, so as to enable the first node to determine the QCL relationship between the first reference signal and the second reference signal according to the QCL association information, the first time window information, and the second time window information included in the indication information.

The embodiments of the present application provide a method for determining a QCL relationship, where the method may include: configuring indication information; and sending the indication information. The indication information includes QCL association information, first time window information and second time window information, and the QCL association information includes a first reference signal having a QCL relationship with the second reference signal, and a QCL type. Through the above design, the determination of the QCL relationship between the first reference signal and the second reference signal according to the QCL association information, the first time window information, and the second time window information included in the indication information can be achieved.

The aforementioned QCL type includes at least one of QCL type A, QCL type B, QCL type C, and QCL type D.

For example, the above-mentioned first reference signal may include any one of SSB, CSI-RS, and DMRS, and the second reference signal may include any one of DMRS, CSI-RS, and PTRS. The first reference signal can be understood as a source signal, and the second reference signal can be understood as a target signal, i.e., the second reference signal can determine the large scale property parameter(s) of the second reference signal through the measurement result of the large scale property parameter(s) of the first reference signal.

The above-mentioned first time window information is used to determine a first limiting condition that the first reference signal has the QCL relationship with the second reference signal, and the second time window information is used to determine a second limiting condition that the second reference signal has the QCL relationship with the first reference signal.

Correspondingly, the first reference signal and the second reference signal mentioned above having a QCL relationship can be understood as the first reference signal and the second reference signal meeting the first limiting condition and second limiting condition mentioned above, simultaneously.

In an example, the first time reference point in the first time window information may include a receiving timepoint of a signaling indicating that the first reference signal and the second reference signal have the QCL relationship, or the first time reference point includes a timepoint of determining the large scale property parameter(s) of the second reference signal.

The second time reference point in the second time window information may include a receiving timepoint of a signaling that the first reference signal and the second reference signal have the QCL relationship, or the second time reference point includes a beginning or ending time-point of the nth symbol or the nth time slot of the first reference signal;

where n is a positive integer less than the number of symbols or time slots occupied by the first reference signal.

Exemplarily, the unit of the above-mentioned second window length may be a number of symbols, a number of time slot, a number of subframe, a number of frame, a second, a millisecond, a microsecond, etc. There can be many different configurations for the second window length to achieve differentiated configurations in different sce-narios.

For example, the second window length can be configured differently according to different large scale property param-eters. For example, different second window lengths for Doppler shift, Doppler spread, average delay, delay spread, and Spatial Rx parameter are configured respectively, and the second window lengths for different large scale property parameters meet a certain quantitative relationship.

Alternatively, the second window length can also be differentially configured according to different large scale property parameter sets. For example, when different large scale property parameters are grouped, the large scale prop-erty parameter(s) in the same set has/have the same second window length, the large scale property parameters between different sets have different second window lengths, and the second window lengths of different sets meet a certain quantitative relationship. For example, the large scale prop-erty parameters can be categorized into three sets according to {Doppler shift, Doppler spread}, {average delay, delay spread}, {Spatial Rx parameter}, and different second win-dow lengths can be configured for the above three sets.

For example, the second window length can also be configured differently according to different QCL types. For example, different second window lengths are configured for QCL type A, QCL type B, QCL type C, and QCL type D, respectively, and the second window lengths for different QCL types meet a certain quantitative relationship.

Different QCL types may be two different QCL types of the same first reference signal that has a QCL relationship with the second reference signal, or may be QCL types of two different first reference signals that have a QCL rela-tionship with the second reference signal, or the different QCL types is a QCL type of the same first reference signal that has a QCL relationship with two different second reference signals.

If the above different QCL types are QCL types of two different first reference signals that have a QCL relationship with the second reference signal, or two different QCL types of a same first reference signal having a QCL relationship with the second reference signal type, then no matter whether the two QCL types are the same, they are consid-ered different.

For example, the aforementioned second window length may also be configured differentially according to the peri-odic characteristics of the first reference signal or the second reference signal. For example, the base station indicates that P-CSI-RS-CSI and P-TRS meet a QCL type A relationship, then the second window length can be associated with a period of P-CSI-RS-CSI or a period of P-TRS.

For example, in a case where both the first reference signal and the second reference signal are periodic signals, the second window length can be associated with a period of the first reference signal, and can also be associated with a period of the second reference signal; in a case where the first reference signal is a periodic signal and the second reference signal is an aperiodic signal or a semi-persistent signal, the second window length may be associated with a period of the first reference signal.

That is, the second window length may be associated with at least one of factors such as a large scale property parameter, a large scale property parameter set, a QCL type, and a period of a reference signal.

For example, the association relationship may include that the second window length meets a functional relationship with at least one of a large scale property parameter, a large scale property parameter set, a QCL type, and a period of a reference signal. For example, the functional relationship may be a positive correlation or a negative correlation.

In an example, the reference signal may be a first refer-ence signal, or the reference signal may be a second refer-ence signal.

In a case where the first reference signal includes a periodic signal, the second time reference point includes a beginning or ending timepoint specifying the nth symbol or the nth time slot of the kth period of the first reference signal; where n is a positive integer less than the number of symbols or time slots occupied by the first reference signal in one period, and k is a positive integer.

Figure 16:
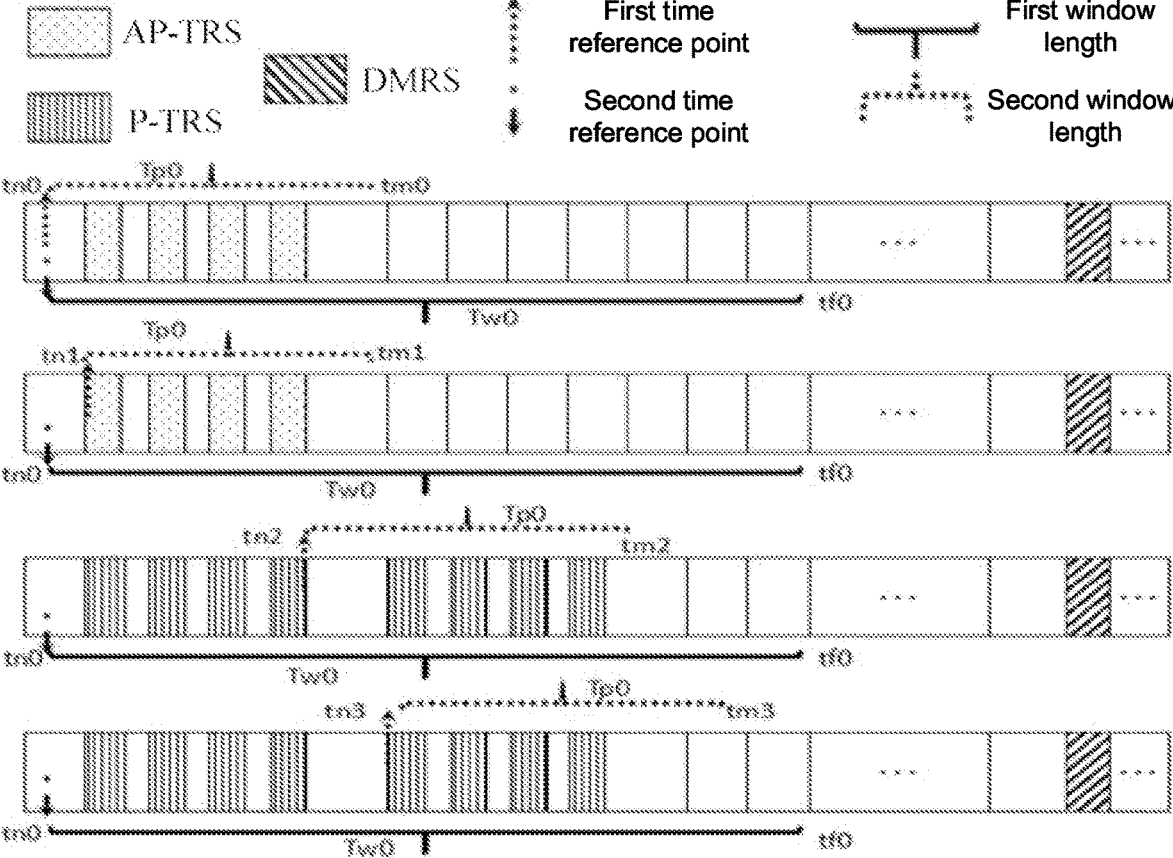
FIG. 16 is a schematic diagram of the configuration of a second time reference point provided by an embodiment of the present application.

As shown in FIG. 16, in an example, the base station can indicate second time reference points in the following dif-ferent situations, for example, DMRS and AP-TRS meet a QCL Type A relationship and the second time reference point and the first time reference point are the same, or DMRS and AP-TRS meet a QCL Type A relationship and the second time reference point is a beginning timepoint of the first symbol of AP-TRS, or DMRS and P-TRS meet a QCL Type A relationship and the second time reference point is an ending timepoint of the last symbol in the first period of P-TRS, or DMRS and P-TRS meet a QCL Type A relation-ship and the second time reference point is a beginning time of the first symbol in the second period of P-TRS.

In the above four situations, the first time reference points are all tn0, the first window lengths are all Tw0, the second window lengths are all Tp0, the second time reference points are tm0, tm1, tm2, tm3 respectively, and time ranges agreed by the first time window information are all tn0~tf0, and time ranges agreed by the second time window information are tn0~tm0, tn1~tm1, tn2~tm2, and tn3~tm3, respectively. Correspondingly, in the above four situations, when DMRS needs to use parameters such as Doppler shift, Doppler spread, average delay, delay spread, etc., time ranges that can be referred to the corresponding second reference sig-nals as tn0~tm0, tn1~tm1, tn2~m2, tn3~tm3.

In a case where the first reference signal includes a periodic signal, a period of the above-mentioned reference signal is a period of the first reference signal; in a case where the second reference signal is a periodic signal, a period of the reference signal is a period of the second reference signal.

Figure 17:
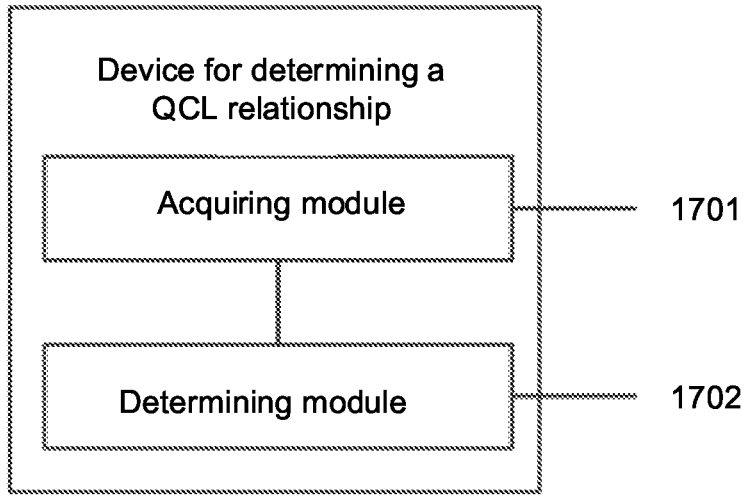
FIG. 17 is a schematic diagram of a device for determining a QCL relationship provided by an embodiment of the present application.

FIG. 17 is a device for determining a QCL relationship provided by an embodiment of the present application. As shown in FIG. 17, the device may include: an acquiring module 1701 and a determining module 1702;

the acquiring module is configured to acquire indication information;

the determining module is configured to determine the QCL relationship between a first reference signal and a second reference signal according to the indication information;

where the indication information includes QCL association information, first time window information and second time window information;

the QCL association information includes the first reference signal having the QCL relationship with the second reference signal, and a QCL type, for example, at least one of QCL type A, QCL type B, QCL type C, and QCL type D.

Exemplarily, the above-mentioned first reference signal may include any one of SSB, CSI-RS, and DMRS, and the second reference signal may include any one of DMRS, CSI-RS, and PTRS. The large scale property parameter(s) of the second reference signal can be determined through the measurement result of the large scale property parameter(s) of the first reference signal.

In an example, the above-mentioned first time window information includes a first time reference point and a first window length, where the first time window information is used to determine a first limiting condition that the first reference signal has the QCL relationship with the second reference signal; the first time reference point includes a receiving timepoint of a signaling indicating that the first reference signal and the second reference signal have the QCL relationship, or the first time reference point includes a timepoint where the large scale property parameter(s) of the second reference signal is/are determined.

The second time window information includes a second time reference point and a second window length, where the second time window information is used to determine a second limiting condition that the second reference signal has the QCL relationship with the first reference signal; the second time reference point includes a receiving timepoint of a signaling indicating that the first reference signal and the second reference signal have the QCL relationship, or the second time reference point includes a beginning or ending timepoint of the nth symbol or the nth time slot of the first reference signal;

where n is a positive integer less than the number of symbols or time slots occupied by the first reference signal.

In a case where the first reference signal is a periodic signal, the second time reference point includes a beginning or ending timepoint specifying the nth symbol or the nth time slot of the kth period of the first reference signal; where n is a positive integer less than the number of symbols or time slots occupied by the first reference signal in one period, and k is a positive integer.

For example, the first reference signal and the second reference signal above having the QCL relationship may be understood as the first reference signal and the second reference signal simultaneously meeting the first limiting condition and the second limiting condition.

The second window length may be associated with at least one of a large scale property parameter, a large scale property parameter set, a QCL type, and a period of the reference signal, where the association relationship may be understood as that the second window length can meet a functional relationship with at least one of the large scale property parameter, the large scale property parameter set, the QCL type, and the period of the reference signal.

Exemplarily, the above-mentioned reference signal may be a first reference signal, or the reference signal may be a second reference signal. In a case where both the first reference signal and the second reference signal are periodic signals, the second window length may be associated with a period of the first reference signal, or may be associated with a period of the second reference signal. In a case where the signal is a periodic signal and the second reference signal is an aperiodic signal or a semi-persistent signal, the second window length may be associated with a period of the first reference signal, that is, in a case where the first reference signal is a periodic signal, the period of the above-mentioned reference signal is the period of the first reference signal. In the case where the second reference signal is a periodic signal, the period of the reference signal is the period of the second reference signal.

The device for determining the QCL relationship provided by this embodiment is configured to implement the method for determining the QCL relationship in the embodiment shown in FIG. 1, and its implementation principle and technical effect are similar, and will not be repeated herein.

Figure 18:
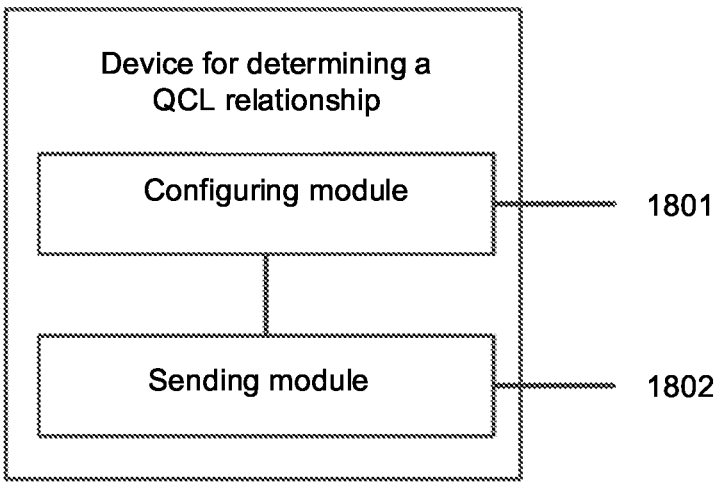
FIG. 18 is a schematic diagram of a device for determining a QCL relationship provided by an embodiment of the present application.

FIG. 18 is a device for determining a QCL relationship provided by an embodiment of the present application. As shown in FIG. 18, the device may include: a configuring module 1801 and a sending module 1802;

the configuring module is configured to configure indication information;

the sending module is configured to send the indication information;

the indication information includes QCL association information, first time window information and second time window information;

the QCL association information includes a first reference signal having the QCL relationship with a second reference signal, and a QCL type. The QCL type may include at least one of QCL type A, QCL type B, QCL type C, and QCL type D.

The first reference signal may include any one of SSB, CSI-RS, and DMRS, and the second reference signal may include any one of DMRS, CSI-RS, and PTRS. The large scale property parameter(s) of the second reference signal can be determined through the measurement result of the large scale property parameter(s) of the first reference signal.

In an example, the first time window information includes a first time reference point and a first window length, where the first time window information is used to determine a first limiting condition that the first reference signal has a QCL relationship with the second reference signal; the first time reference point includes a receiving timepoint of a signaling indicating the first reference signal and the second reference signal have the QCL relationship, or, the first time reference point includes a timepoint where the large scale property parameter(s) of the second reference signal is/are determined.

The second time window information includes a second time reference point and a second window length, where the second time window information is used to determine a second limiting condition that the second reference signal has the QCL relationship with the first reference signal. The second time reference point includes a receiving timepoint of a signaling indicating that the first reference signal and the second reference signal have a QCL relationship, or, the second time reference point includes a beginning or ending timepoint of the nth symbol or the nth time slot of the first reference signal;

where n is a positive integer less than the number of symbols or time slots occupied by the first reference signal.

In a case where the first reference signal includes a periodic signal, the second time reference point includes a beginning or ending timepoint specifying the nth symbol or the nth time slot of the kth period of the first reference signal; where n is a positive integer less than the number of symbols or time slots occupied by the first reference signal in one period, and k is a positive integer.

In an example, the first reference signal and the second reference signal above having the QCL relationship includes: the first reference signal and the second reference signal simultaneously meeting the first limiting condition and the second limiting condition.

In an example, the second window length is associated with at least one of a large scale property parameter, a large scale property parameter set, a QCL type, and a period of the reference signal, where the association relationship may include the second window length meeting the functional relationship with at least one of the large scale property parameters, the large scale property parameter set, the QCL type, and the period of the reference signal.

The above-mentioned reference signal may be a first reference signal, or the reference signal may be a second reference signal. In a case where both the first reference signal and the second reference signal are periodic signals, the second window length may be associated with a period of the first reference signal, or may be associated with a period of the second reference signal. In a case where the first reference signal is a periodic signal, the second reference signal is an aperiodic signal or a semi-persistent signal, the second window length may be associated with a period of the first reference signal.

That is, in a case where the first reference signal is a periodic signal, the period of the above-mentioned reference signal is the period of the first reference signal. In a case where the second reference signal is a periodic signal, the period of the reference signal is the period of the second reference signal.

The device for determining the QCL relationship provided by this embodiment is configured to implement the method for determining the QCL relationship in the embodiment shown in FIG. 15, and its implementation principle and technical effect are similar, and will not be repeated herein.

Figure 19:
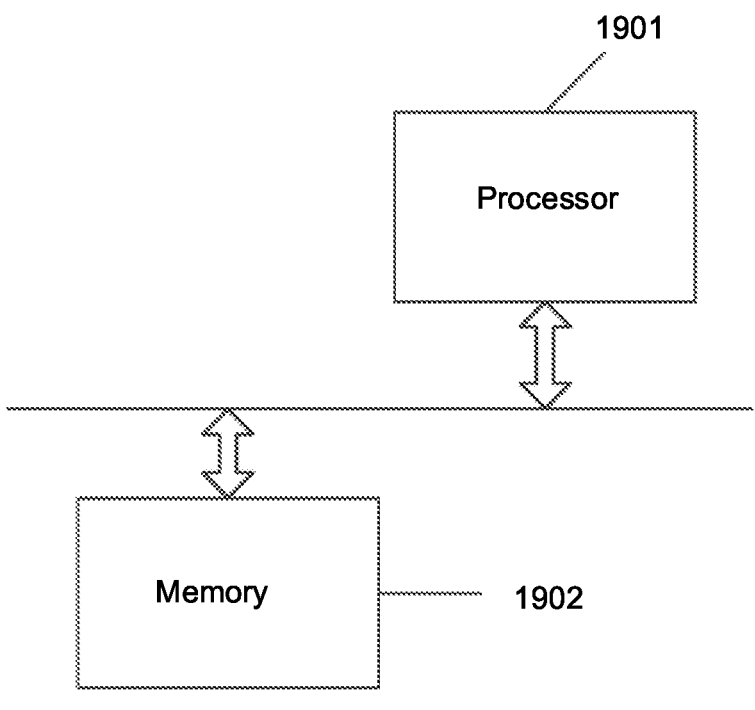
FIG. 19 is a schematic diagram of a networks node provided by an embodiment of the present application.

FIG. 19 is a schematic structural diagram of a network node provided by an embodiment. As shown in FIG. 19, the node includes a processor 1901 and a memory 1902; the number of processors 1901 in the node can be one or more, and in FIG. 19, one processor 1901 is taken as an example; the processor 1901 and the memory 1902 in a node can be connected through a bus or in other ways, and the connection through a bus is taken as an example in FIG. 19.

The memory 1902, as a computer-readable storage medium, can be configured to store software programs, computer-executable programs and modules, such as program instructions/modules corresponding to the method for determining the QCL relationship in the embodiment of FIG. 1 or FIG. 15 of the present application (for example, the acquiring module 1701 and the determining module 1702 or the configuration module 1801 and the sending module 1802) in the device for determining the QCL relationship. The processor 1901 implements the above-mentioned method for determining the QCL relationship by running the software programs, instructions and modules stored in the memory 1902.

The memory 1902 may mainly include an area for storing programs and an area for storing data, where the area for storing programs may store an operating system, and an application program required by at least one function unit, and the area for storing data can store data, such as data created according to the usage of the set-top box. The memory 1902 may include a high-speed random access memory, and may also include a non-volatile memory, such as at least one of magnetic disk storage device, a flash memory device, or other non-volatile solid state storage devices.

In an example, the processor in the above node may also implement the above method for determining the QCL relationship through its internal hardware circuits, such as logic circuits, and gate circuits.

The embodiments of the present application further provide a readable and writable storage medium, configured as a computer storage, the storage medium stores one or more programs, where the one or more programs can be executed by the one or more processors to perform the above method for determining the QCL relationship in the above embodiments.

It can be understood by those of ordinary skill in the art that all or some of the steps in the method disclosed above and the functional modules/units in the device may be implemented as software, firmware, hardware and appropriate combinations thereof.

In a hardware implementation, division between functional modules/units mentioned in the above description does not necessarily correspond to division of physical components; for example, one physical component may have multiple functions, or one function or step may be performed cooperatively by several physical components. Some or all of the hardware components may be implemented as software executed by a processor, such as a central processing unit, a digital signal processor, or a microprocessor, or implemented as a hardware, or implemented as an integrated circuit, such as an application-specific integrated circuit. Such software may be distributed on a computer readable medium, which may include a computer storage medium (or a non-transitory medium) and a communication medium (or a transitory medium). As is well known for those of ordinary skill in the art, the term "computer storage medium" includes volatile medium and nonvolatile medium, removable medium and non-removable medium implemented in any method or technology for storage of information, such as computer readable instructions, data structures, program modules, or other data. The computer storage media includes, but is not limited to, random access memories (RAM), read-only memories (ROM), electrically erasable programmable read-only memories (EEPROM), flash memories or other memory technologies, compact disc read-only memories (CD-ROM), digital versatile disks (DVD) or other optical disk storages, magnetic cartridges, tapes, magnetic disk storages or other magnetic storage devices, or any other media that are used to store desired information and can be accessed by a computer. In addition, as is well known for those of ordinary skill in the art, communication media typically include computer readable instructions, data structures, program modules, or other data in a modulated data signal such as a carrier wave or other transport mechanism, and may include any information delivery media.

What is claimed is:
1. A method for determining a quasi-co-location (QCL) relationship, applied to a first node, comprising:
acquiring indication information;

19 determining the QCL relationship between a first reference signal and a second reference signal according to the indication information;

wherein the indication information comprises the QCL association information, first time window information and second time window information;

the QCL association information comprises the first reference signal having the QCL relationship with the second reference signal, and a QCL type;

the first time window information comprises a first time reference point and a first window length, wherein the first time window information is used to determine a first limiting condition that the first reference signal has the QCL relationship with the second reference signal;

the first time reference point comprises a receiving time-point of a signaling indicating that the first reference signal and the second reference signal have the QCL relationship, or the first time reference point comprises a timepoint where a large scale property parameter of the second reference signal is determined;

the second time window information comprises a second time reference point and a second window length, wherein the second time window information is used to determine a second limiting condition that the second reference signal has the QCL relationship with the first reference signal;

the second time reference point comprises a receiving timepoint of a signaling indicating that the first reference signal and the second reference signal have the QCL relationship; or, the second time reference point comprises a beginning or ending timepoint of the nth symbol or the nth time slot of the first reference signal;

wherein n is a positive integer less than the number of symbols or time slots occupied by the first reference signal.

2. The method according to claim 1, wherein the QCL type comprises at least one of QCL type A, QCL type B, QCL type C, and QCL type D.

3. The method according to claim 1, wherein the first reference signal comprises any one of synchronization signal/physical broadcast channel block (SSB), channel state information reference signal (CSI-RS), and dedicated demodulation reference signal (DMRS);

the second reference signal comprises any one of DMRS, CSI-RS, and phase tracking reference signal (PTRS).

4. The method according to claim 1, wherein in a case that the first reference signal is a periodic signal, the second time reference point comprises a beginning or ending timepoint specifying the nth symbol or the nth time slot of the kth period of the first reference signal;

wherein n is a positive integer less than the number of symbols or time slots occupied by the first reference signal in one period, and k is a positive integer.

5. The method according to claim 1, wherein the first reference signal having the QCL relationship with the second reference signal comprises:

the first reference signal and the second reference signal simultaneously meeting the first limiting condition and the second limiting condition.

6. The method according to claim 1, wherein the second window length is associated with a reference factor, where the reference factor comprises at least one of the following:

a large scale property parameter, a large scale property parameter set, a QCL type, a period of a reference signal.

7. The method according to claim 6, wherein the second window length being associated with the reference factor comprises the second window length and the reference factor satisfying a functional relationship.

8. The method according to claim 6, wherein the reference signal is the first reference signal, or the reference signal is the second reference signal;

wherein in a case where the first reference signal is a periodic signal, a period of the reference signal is a period of the first reference signal;

in a case where the second reference signal is a periodic signal, the period of the reference signal is a period of the second reference signal.

9. A non-transitory computer-readable storage medium having stored therein a computer program which, upon being executed by a processor, implements the method for determining a QCL relationship according to claim 1.

10. A method for determining a quasi-co-location (QCL) relationship, applied to a second node, comprising:

configuring indication information;

sending the indication information;

wherein the indication information comprises the QCL association information, first time window information and second time window information;

the QCL association information comprises first reference signal having the QCL relationship with second reference signal, and a QCL type;

the first time window information comprises a first time reference point and a first window length, wherein the first time window information is used to determine a first limiting condition that the first reference signal has the QCL relationship with the second reference signal;

the first time reference point comprises a receiving time-point of a signaling indicating that the first reference signal and the second reference signal have the QCL relationship, or the first time reference point comprises a timepoint when a large scale property parameter of the second reference signal is determined;

the second time window information comprises a second time reference point and a second window length, wherein the second time window information is used to determine a second limiting condition that the second reference signal has the QCL relationship with the first reference signal;

the second time reference point comprises a receiving timepoint of a signaling indicating that the first reference signal and the second reference signal have the QCL relationship; or, the second time reference point comprises a beginning or ending timepoint of the nth symbol or the nth time slot of the first reference signal;

wherein n is a positive integer less than the number of symbols or time slots occupied by the first reference signal.

11. The method according to claim 10, wherein the QCL type comprises at least one of QCL type A, QCL type B, QCL type C, and QCL type D.

12. The method according to claim 10, wherein the first reference signal comprises any one of synchronization signal/physical broadcast channel block (SSB), channel state information reference signal (CSI-RS), and dedicated demodulation reference signal (DMRS);

the second reference signal comprises any one of DMRS, CSI-RS, and phase tracking reference signal (PTRS).

13. The method according to claim 10, wherein in a case that the first reference signal is a periodic signal, the second time reference point comprises a beginning or ending timepoint specifying the nth symbol or the nth time slot of the kth period of the first reference signal;

wherein n is a positive integer less than the number of symbols or time slots occupied by the first reference signal in one period, and k is a positive integer.

14. The method according to claim 10, wherein the first reference signal having the QCL relationship with the second reference signal comprises:

the first reference signal and the second reference signal simultaneously meeting the first limiting condition and the second limiting condition.

15. The method according to claim 10, wherein the second window length is associated with a reference factor, where the reference factor comprises at least one of the following:

a large scale property parameter, a large scale property parameter set, a QCL type, a period of a reference signal;

wherein the second window length being associated with the reference factor comprises the second window length and the reference factor satisfying a functional relationship.

16. The method according to claim 15, wherein the reference signal is the first reference signal, or the reference signal is the second reference signal.

17. The method according to claim 16, wherein in a case where the first reference signal is a periodic signal, a period of the reference signal is a period of the first reference signal;

in a case where the second reference signal is a periodic signal, the period of the reference signal is a period of the second reference signal.

18. A communication node, comprising: a processor, wherein the processor is configured to execute a computer program to:

acquire indication information;

determine a quasi-co-location (QCL) relationship between a first reference signal and a second reference signal according to the indication information;

wherein the indication information comprises the QCL association information, first time window information and second time window information;

the QCL association information comprises the first reference signal having the QCL relationship with the second reference signal, and a QCL type;

the first time window information comprises a first time reference point and a first window length, wherein the first time window information is used to determine a first limiting condition that the first reference signal has the QCL relationship with the second reference signal;

the first time reference point comprises a receiving timepoint of a signaling indicating that the first reference signal and the second reference signal have the QCL relationship, or the first time reference point comprises a timepoint where a large scale property parameter of the second reference signal is determined;

the second time window information comprises a second time reference point and a second window length, wherein the second time window information is used to determine a second limiting condition that the second reference signal has the QCL relationship with the first reference signal;

the second time reference point comprises a receiving timepoint of a signaling indicating that the first reference signal and the second reference signal have the QCL relationship; or, the second time reference point comprises a beginning or ending timepoint of the nth symbol or the nth time slot of the first reference signal;

wherein n is a positive integer less than the number of symbols or time slots occupied by the first reference signal.

* * * * *